(12) United States Patent
Vandergheynst (10) Patent No.: US 8,634,514 B2
(45) Date of Patent: Jan. 21, 2014

(54) CRITICALITY PREVENTION DEVICES AND METHODS IN NUCLEAR FUEL PRODUCTION

(75) Inventor: Alain Vandergheynst, Dour (BE)

(73) Assignee: Belgonucleaire SA, Brussels (BE)

( * ) Notice: Subject to any disclaimer, the term of this patent is extended or adjusted under 35 U.S.C. 154(b) by 737 days.

(21) Appl. No.: 12/304,709

(22) PCT Filed: Jun. 14, 2007

(86) PCT No.: PCT/EP2007/055921
§ 371 (c)(1),
(2), (4) Date: Apr. 10, 2009

(87) PCT Pub. No.: WO2007/144414
PCT Pub. Date: Dec. 21, 2007

(65) Prior Publication Data
US 2010/0061501 A1   Mar. 11, 2010

(30) Foreign Application Priority Data
Jun. 15, 2006 (EP) .................................... 06115555

(51) Int. Cl.
*G21C 19/40* (2006.01)
*G21C 19/00* (2006.01)
*G21C 21/02* (2006.01)

(52) U.S. Cl.
USPC ..... 376/272; 376/260; 250/505.1; 250/506.1; 250/507.1

(58) Field of Classification Search
USPC ......... 376/272, 260; 250/506.1, 507.1, 505.1; 588/1, 16
See application file for complete search history.

(56) References Cited

U.S. PATENT DOCUMENTS 3,754,141 A * 8/1973 Leebl et al. ................ 250/507.1
3,832,563 A * 8/1974 Dubovsky et al. ......... 250/506.1

(Continued)

FOREIGN PATENT DOCUMENTS

DE    33 14 805 A1   10/1984
EP    0 102 562 A    3/1984

(Continued)

OTHER PUBLICATIONS

Translation of Suzuki et al, JP-08029596 A, "Drip Tray", Feb. 1996, online computerized translation into English from the original Japanese (see IDS).*

(Continued)

*Primary Examiner* — Bernarr Gregory
(74) *Attorney, Agent, or Firm* — Sughrue Mion, PLLC (57) ABSTRACT

The invention concerns a vessel for processing, transfer, accumulation and/or transfer of material containing civilian or military origin plutonium, in the form of plutonium oxide, carbide and/or nitride. The plutonium is preferably present in a concentration not higher than a guaranteed maximum between 20 and 50% wt. in said material, possibly with other actinides such as americium, neptunium, or curium. Said material is preferably in form of powder, granulate and/or tablets. The vessel comprises a volume of 20 to 70 liters for containing said material, demarcated at least by two substantially parallel walls, these two walls being separated by a distance e between 8 and 15 cm. The invention concerns also an enclosure comprising analogous geometrically safe criticality-preventing means (bottom-catcher), a fuel production plant comprising a set of such vessels, preferably installed in a set of said enclosures, as well as a nuclear fuel production process carried out in a set of such vessels, preferably installed in a set of said enclosures.

3 Claims, 8 Drawing Sheets

(56) References Cited

U.S. PATENT DOCUMENTS

| | | | |
|---|---|---|---|
| 3,882,313 A | 5/1975 | Siemens, Jr. | |
| 4,185,926 A | 1/1980 | Lyon | |
| 4,535,250 A * | 8/1985 | Fields | 250/507.1 |
| 5,745,835 A | 4/1998 | Mouliney et al. | |
| 6,764,618 B1 | 7/2004 | Vandergheynst et al. | |
| 6,783,706 B1 | 8/2004 | Vandergheynst et al. | |

FOREIGN PATENT DOCUMENTS

| | | | |
|---|---|---|---|
| EP | 0 530 636 A1 | 3/1993 |
| EP | 0 767 465 A1 | 4/1997 |
| GB | 882950 A | 11/1961 |
| GB | 1 280 864 A | 7/1972 |
| JP | 64-13499 A | 1/1989 |
| JP | 04-031792 A | 2/1992 |
| JP | 08-089775 A | 4/1996 |
| JP | 09-178888 A | 7/1997 |
| WO | 00/45394 A1 | 8/2000 |
| WO | 01/03143 A1 | 1/2001 |
| WO | 2004/078303 A2 | 9/2004 |
| WO | 2004/112053 A1 | 12/2004 |
| WO | 2007/144414 A1 | 12/2007 |

OTHER PUBLICATIONS

"Règles Applicables à la prévention des Risques dus Aux Rayonnements Ionisants," Oct. 18, 1984, pp. 431-433.

Labilloy, Marc, et al., "Dantsys and MCNP as Versatile Tools for the Safety Aspects of the Belgonucleaire MOX Plant," 2005, American Nuclear Society, pp. 1-12.

Vandergheynst, Alain, "Major Engineering Issues of Plutonium Bearing Fuel Fabrication Facilities," May 16-20, 2005, pp. 1-8.

American Nuclear Society, Nuclear Criticality Safety in Operations with Fissionable Materials Outside Reactors, Aug. 1, 1998, pp. 1-18.

Lance, B. et al.; "Criticality Codes Validation on Spherical Plutonium Systems"; Workshop on the need for integral experiments with low-moderated MOX fuels; Apr. 14-15, 2004; pp. 1-9; Paris, France.

Database WPI Week 198909; Jan. 18, 1989; Derwant Publication Ltd, London GB, Appl. No. 1989-063436 XP002456482.

Database WPI Week 199615; Feb. 2, 1989; Derwant Publication Ltd., London GB, Appl. No. 1996-142917 XP002456483.

* cited by examiner

CRITICALITY PREVENTION DEVICES AND METHODS IN NUCLEAR FUEL PRODUCTION

CROSS REFERENCE TO RELATED APPLICATION

This application is a National Stage of International Application No. PCT/EP2007/055921 filed Jun. 14, 2007, claiming priority based on European Patent Application No. 06115555.2, filed Jun. 15, 2006, the contents of all of which are incorporated herein by reference in their entirety.

DOMAIN OF THE INVENTION

The present invention relates to devices and methods for preparing nuclear fuel.

Nuclear energy is called to play an increasing role in a sustainable world energy mix. The limited nature of economically attractive uranium resources will increasingly justify recycling the reusable materials present in spent fuels. The production of MOX nuclear fuel containing mixed oxides of uranium and civilian plutonium has already been industrially proved in plants carrying out the MIMAS production process described in the paper "MIMAS, Setting the world-wide standard for plutonium recycling" presented by A. Vandergheynst and Y. Vanderborck at the 13th International Conference on Nuclear Engineering (ICONE), held in Beijing (May 16-20, 2005). MOX fuel production for thermal neutron and fast neutron reactors is the current reference for weapon-grade plutonium demilitarization programs. New generations of nuclear reactors having recourse to new types of fertile or inert matrix nuclear fuels are being considered for the coming decades, in some cases with the aim of reducing proliferation risks (e.g. the GNEP initiative). New cycles like that of U-Th are considered. Non-metallic fuels, other than the already well-known oxides and carbides are considered, such as the nitrides, for example.

For the next few decades, the production of mixed oxide fuels for the current light water reactors and the reactors of the immediately next generation 3+ (ABWR, EPR, AP) will continue to be the reference and will continue to be ensured in the form of fuel tablets enclosed in tight claddings, themselves assembled in bundles (or assemblies).

On the other hand, the final disposal problems of spent fuels could revive reprocessing/recycling. New used fuel reprocessing processes (e.g. UREX), supposedly less proliferating that the industrially proven PUREX process could be developed and industrialized. While present processes are usually carried out in glovebox-type enclosures, i.e. sealed containers with at least one transparent window and at least one glove built into one of the container's walls, so as to allow an operator to manipulate materials and/or maintain process equipment within the container in an alpha-tight way, these new processes, because of the intense gamma-emission of transuranic actinides, such as americium, neptunium or curium present aside the plutonium, could require an at least partial implementation of the fuel production in hot cells, that is, heavily shielded rooms with remote manipulators. Given the difficulty of process equipment maintenance with remote manipulators, it is preferable to simplify as much as possible the fuel processing steps to be carried out within such hot cells.

In the framework of the globalization of the economy and the liberalization of energy markets, the general economics of all these matters, present as well as future, will be a determining element of the viability of future developments, without making any concession, even minor, to the safety of population or environment.

New medium- and large-size fuel production plants to be constructed will handle fissile materials, such as plutonium, by tens of kilograms or more, thus generating possible criticality risks. The already decided or proposed factories use as feed products pure plutonium oxides or mixtures of uranium oxide and plutonium oxide with a high plutonium oxide content, such as, for instance, 50% wt. in Japan, which definitely improves the proliferation resistance.

The occurrence risk of a criticality accident caused by the arrangement of fissile materials and neutron moderators in certain quantities and geometries is unacceptable because of the possible radiological and mechanical consequences. Such a risk could occur under exploitation operations close to normal, for instance in case of a failure of automatic controls or of operator errors, but also during accidental situations of internal origin, such as a fire, a constructive failure, a load drop or an internal flooding, or of external origin, such as an earthquake, an airplane crash or a general flooding. Such accidental situations could have a natural or/and a human origin.

The purpose of the present invention is that of better preventing the criticality risk in future fuel plants. The devices and processes of the invention are aimed at simplifying the prevention systems in order to increase their reliability and simplify their maintenance. In doing this they also help reduce the capital and operation costs. The implementation of these devices and procedures is particularly advantageous when the nuclear fuel production takes place in hot cells, because of the reduced operability and maintainability conditions.

STATE OF THE ART

Generally, the nuclear fuel used in current nuclear reactors, as well as in the forthcoming generation of reactors, is composed of assemblies, or bundles, of nuclear fuel rods. Such a rod usually comprises a metallic cladding tube sealed at its open ends by two end plugs and containing a plurality of cylindrical ceramic pellets containing an oxide, nitride or carbide of at least one fissile element, such as uranium or plutonium. Depending on the fuel management strategy, other fertile or inert elements may be mixed to the at least one fissile element. The various existing nuclear fuel production plants produce such nuclear fuel pellets containing mixed oxides (MOX) of uranium and of plutonium, although mixed nitrides and/or carbides have also been proposed. These existing plants have an annual capacity between 40 and 200 tonnes of heavy metal, i.e. a processing of 2 to 10 tonnes of plutonium metal per year. As feed products, these plants receive fresh uranium oxide from conversion plants and plutonium oxide from reprocessing plants. This plutonium oxide may be received pure or already diluted with uranium oxide. Such a mixture may have been prepared in wet phase in the reprocessing plant. The feed products may be in powdered and/or granulated form.

In a first processing step, the uranium oxide and the pure or diluted plutonium oxide are mixed mechanically in batches. Next, they are comminuted or milled to produce a homogeneous mixture so as to avoid the presence of highly enriched regions in the fuel pellets that could form hot spots when the fuel is loaded into a reactor, and to improve the chemical solubility of the fuel after irradiation, so as to facilitate its reprocessing.

Among the plants having proved at the same time acceptable safety and production and quality conform to the objectives are plants operating in gloveboxes according to the MIMAS process described in the international patent applications WO 00/45394 or WO 01/03143. MIMAS is an acronym for MIcronization-MASter blend. This MIMAS process produces a $UO_2$-like fuel, i.e. in the form of a solid solution of (U—Pu)$O_2$-rich particles in a $UO_2$ matrix, as described in the abovementioned paper "MIMAS, Setting the world-wide standard for plutonium recycling". To achieve this, this MIMAS process comprises a second mixing step, where the product of the previously mentioned comminuting step is blended with additional uranium oxide in powdered and/or granulated form. However, other known MOX fuel production processes, such as, for example, those known as SBR and COCA, do not comprise such a second mixing step. In these alternative processes, all the uranium and plutonium oxides of a batch are mixed in a single step.

To improve the flowability of the mixture for further pelletizing, additional mechanical processing steps, such as spheroidising, may be carried out after the mixing and comminuting steps.

Additives may also be added to the mixture. Some additives, such as, for example, organometallic poreformers and/or lower density oxides, such as $U_2O_8$, may be added to control the density of the mixture after sintering. Lubricating additives, such as zinc, calcium and/or lithium stearate, may also be added, so as to facilitate pelletizing. Some of these additives present neutron moderating properties due to their content in hydrogen and/or carbon.

The loose mixture is then shaped into pellets in pelletizing systems. As an alternative to solid mass lubrication, the pelletizing dies may be lubricated by oil injection in the future.

Finally, the pellets are sintered in sintering ovens, so as to consolidate them. After cylindrical grinding and stacking, the resulting sintered nuclear fuel pellets are then ready to be loaded into nuclear fuel rods, which in turn can be bundled into bundles or assemblies for loading into nuclear reactors.

In such nuclear fuel production plants and processes, fuel production is organized in batches, for traceability and quality management purposes, and the main mechanical or thermal operations of the production process, such as mixing, comminuting, pressing, or sintering, are dry, that is, avoiding aqueous or liquid media. In these same plants, criticality prevention is generally ensured by different approaches for storage and process equipment.

For storage devices, such as mass storage and in- or on-line buffer storage devices, the best prevention is conventionally ensured by installing the individual devices in separate premises with, at most, a very limited fire risk, and with earthquake-resistant structures, and keeping a sufficient grid pitch for all moderation conditions, this grid pitch, which is the geometric distance between individual containers, being ensured for all possible accidental conditions.

For the process equipment, such as the devices for primary or secondary mixing, comminuting, crushing, granulation, homogenization, pelletizing, sintering, grinding, or scrap recycling, which are generally present at the rate of several devices in one premise, the prevention of criticality in normal or nearly normal exploitation conditions is conventionally ensured by the limitation of the fissile material mass in each device or in the premise, as well as of the moderation provided by process additives containing hydrogen and/or carbon, such as powder lubricants and pore-forming agents. The occurrence of a criticality incident or accident would therefore be unlikely, because it would need the simultaneous occurrence of two independent and improbable anomalies, what is known as "double contingency", and because of the wide safety margins, since every neutron source is modelled as a fully water-reflected sphere, as disclosed for instance, in "Criticality codes validation on spherical plutonium systems", B. Lance et al, Workshop on the need for integral experiments with low-moderated MOX fuels", Paris, Apr. 14-15, 2004; and "DANTSYS and MCNP as versatile tools for the safety aspects of the BELGONUCLEAIRE MOX plant", M. Labilloy et al, M&C Proceedings, Avignon, Sep. 12-15, 2005.

This evolutionary approach has been dictated by the progressive passage from laboratory installations to pilot installations and finally to large capacity industrial installations. Until now, the limited number of installations, the multiplicity of process and safety constraints and the cost of these installations, both in respect to investment and dismantling costs, and the difficulty of performing life-size experiments have led nuclear operators and engineers to keep this approach of limiting masses and moderators and to install supplementary automated controls, rather than to seek other plant and equipment concepts. These proven solutions have been thought for long to be the best available techniques.

In these plants, maintaining these mass and moderation limitations is generally ensured by a combination of at least one sensor, such as a balance, a scale, etc., and of at least one simple and/or redundant calculator, such as a nuclear material management calculator, a programmable logic controller or a programmable criticality safety automated control system. These devices are possibly complex and of limited reliability, and therefore constitute a possible source of error.

Due to the various material densities under various operating conditions, a process device can receive up to several times the nominal quantity of materials to be treated. The moderating material, which is usually limited to a few percentage points of the mass of nuclear material, could also be added several times in case of failure or error. This is known as "double or multiple batching".

Working disturbances, such as breakdowns or blockages, during operation of the process devices may require interventions going beyond routine in the presence of fissile material. This may lead to variable situations, of which all criticality safety aspects could not have been extensively evaluated in advance.

Limiting the mass of moderating material in the process or storage devices also requires preventing the dispersal of moderating material in the enclosures, such as glove boxes or hot cells, and/or premises in which these devices are located, and this in all situations. Such moderating material could be, for example, water from a water-cooling system or from a natural origin, such as rain or flooding. It could also be, for instance, hydraulic fluid from process equipment, such as a pelletizing press. This requirement of non-dispersal is complicated and expensive to fulfill. Moreover, in some process devices, since the mass of fissile material processed is higher than that of a subcritical sphere at optimum moderation/reflection, it is necessary to ensure that the fissile material will remain contained in containers and process devices of guaranteed integrity even in accidental situations, such as an earthquake.

Limiting the masses of fissile and moderating material supplied to the various process and storage devices leads to numerous requirements in construction, qualification and operation, such as, for example:

prevention of non-multiple batching;

training and supervision of personnel participating in administrative operations;

quality assurance of the dimensioning and construction of the structures; and redundancies in the automated systems and quality assurance of the various control devices and/or programmable systems during their whole lifecycle.

The qualification of the integrity assurance in accidental situations can need important qualification efforts and/or overdimensioning. Such qualification efforts may involve steps such as 1:1 scale seismic qualification on a vibrating table or stress time history calculation.

It will also be noted that the use of water as fire-extinguishing means has been systematically excluded in medium- or large-sized fuel plants, due to its moderating properties.

Despite all these measures, highly hypothetical or ultimate situations of accident combinations, such as for instance, an earthquake followed by a fire are sometimes not addressed.

To solve these problems, it has been proposed in prior art to use safe geometries in fissile material storage devices and processing devices so far as possible. The design and operating rules dictated by safety authorities of large nuclear countries for criticality prevention in non-reactor installations (for instance, French "Règle Fondamentale de Sûreté" RFS I.3.c—October 1984 and American ANSI 8.1.1998), while preferring safe geometries, acknowledge the methods of mass and moderation limitation for nuclear fuel fabrication as a matter of fact.

One prior art is represented by an annular, elongated, horizontal axis dry mixing device disclosed in British patent GB1280864 of Alkem, published in 1972. However, while the stated purpose of the proposed dimensions of this mixing device is also that of preventing criticality, this device is intended to be used exclusively for the mixing of powdered nuclear fuels, that is, the last stage of nuclear fuel powder preparation before pelletizing, and is therefore not suitable for high concentrations of fissile material, such as the 20 to 50% wt. plutonium that can be reached during the preparation of MOX powders. With the proposed volume of 80 liters this mixing device would appear to be too large to prevent criticality for such high concentrations of fissile material under all possible moderation conditions, even in case of accident.

A method and device for loosening and mixing $UO_2$ and $PuO_2$ is disclosed in Japanese patent application JP8089775 of MMC, published 1996, wherein a horizontal rotating disc is used with a safe slab geometry. In this case, however, the proposed volume of the device appears to be too small for an economically optimal process.

Other plutonium processing devices that have been proposed are based on comparatively safe geometries for aqueous phase separation and conversion plants:

International patent application WO 2004078303 of BNFL published 2004 discloses a continuous liquid phase electrochemical separation process (U—Pu), in vessels with a slab geometry. However, the large volume of the proposed vessels, at 100 or 300 liters, also appears to fail to ensure safety under all possible moderation conditions, even in case of accident.

European patent application EP0767465 of CEA, published 1997, discloses a process and device for the dilution of a U and Pu oxide mix, in vessels with sub-critical geometry. However, the precise shape and dimensions of the vessels are not disclosed.

A recuperation in slab process and device described in Japanese patent application JP 09-178888 of MMC published 1997.

Japanese patent application JP 04-031792 of Power Reactor & Nuclear Fuel, published 1992, discloses an annular solution storage tank, but does not appear to specify its dimensions.

British patent GB8822950 of AEA, published 1961, disclosed tubular vessels with limited diameters for containing a plutonium solution. As in JP4031792, although the purpose of preventing criticality conditions is mentioned, no specific dimensions are disclosed.

SUMMARY OF THE INVENTION

The present invention concerns first a safe processing, transfer, accumulation and/or storage vessel for material containing plutonium of civilian or military origin in the form of plutonium oxide, carbide and/or nitride with a predetermined isotopic envelope. Said material may contain other actinides such as americium, neptunium, or curium. Moreover, said material is preferably solid, in particular in the form of powder, granulate and/or tablets.

The purpose of the present invention is preventing criticality in all filling conditions of such a vessel and in all conditions of neutron moderation and reflection that can be encountered in such a vessel in normal, incidental or accidental conditions, as well as for all the plutonium concentrations, densities and isotopic compositions possibly encountered in the Pu-bearing fuel fabrication plant where these vessels are installed. For this purpose, the vessel of the invention comprises a volume of 20 to 70 liters for containing said material, demarcated at least by two substantially parallel walls and, these two walls being separated by a distance e between 8 and 15 cm. As <<substantially parallel>> should be understood walls that can diverge by an angle not higher than 15°.

Advantageously, said volume is between 20 and 50 liters, has a height h between 30 and 60 cm, and an annular shape where one of said two substantially parallel walls is internal and the other external, each one of said walls forming a substantially rotationally symmetrical surface, said surfaces being substantially concentric, and the interior wall demarcating a core with a diameter d between 10 and 30 cm. With this configuration, it is possible to form a vessel allowing the flow of material in the height direction, while maintaining the prescribed distance between inner and outer wall within limited height and width dimensions. This device can thus form a safe but also compact jar or hopper.

Particularly advantageously, said volume comprises a sole opening for the introduction and extraction of said material, said surfaces being preferably substantially cylindrical. As <<substantially cylindrical>> are understood walls that can present a conicity angle not higher than 15°. With this configuration of the vessel can form a safe but particularly compact jar.

Alternatively, but also particularly advantageously, the axis of symmetry of said surfaces is substantially vertical and said volume comprises a higher opening for the introduction of said material and a lower opening for the extraction of said material. In this configuration, the device can form a safe but particularly compact hopper.

Alternatively, said volume is between 40 and 70 liters and has a substantially cylindrical and flat shape, wherein said two walls are substantially flat and said volume is also demarcated by a third, substantially cylindrical, wall with a diameter D between 70 and 90 cm and joining the two substantially flat walls. In this disc-like configuration the vessel can form a safe but particularly efficient device for crushing or comminuting solid material containing plutonium. In particular it can form a safe and efficient ball mill.

Another objective of the present invention is preventing that, in a containment enclosure, such as, for example, a glove box or a hot cell, for processing material containing civilian or military origin plutonium in the form of plutonium oxide, carbide and/or nitride, criticality may be reached by a spillage of said plutonium-containing material. The plutonium-containing material may also contain other actinides such as americium, neptunium, or curium. Moreover, said plutonium-containing material is preferably in the form of powder, granulate and/or tablets. Said containment enclosure comprises a perimeter and a base.

The problem addressed by this embodiment of the present invention is also the prevention of the criticality risk in all neutron moderation and reflection conditions that can be encountered in any condition, such as a normal condition, a close-to-normal condition, an incidental condition or an accidental condition.

For this purpose, said containment enclosure comprises, at its base and possibly around its perimeter, a plurality of separate sub-critical spaces for catching spilled plutonium-containing material.

Advantageously, said sub-critical spaces are separated by passive parts, at least partially metallic and filled preferably with a solid, mineral and neutron-absorbing material, each one of said sub-critical spaces being demarcated by at least two substantially parallel and vertical walls having a height h between 30 and 50 cm, and separated by a distance e between 8 and 12 cm, and said at least partially metallic parts having a thickness p between 10 and 15 cm. As <<substantially vertical>> are understood walls not presenting an angle superior to 15° with respect to the vertical. These dimensions ensure sub-criticality within a large range of plutonium concentrations, densities, for a broad isotopic envelope and in even the most negative neutron moderation and reflection conditions.

In case of spillage, these sub-critical spaces, whose shape and volume would ensure their sub-criticality under any conditions of neutron moderation, could receive the spilled plutonium-containing matter. Preferably, the available volume of the sub-critical spaces would be superior to that of the plutonium-containing matter that could be simultaneously processed and/or stored in said containment enclosure at any given moment, so that, even if all of said plutonium-containing matter was spilled, it could safely be received into said sub-critical spaces.

Advantageously, said enclosure according to the invention contains at least one of said vessels according to the invention.

Advantageously, the total volume of said spaces of the containment enclosure would be higher than the volume of said at least one vessel. Thus, even if all the plutonium-containing material in said vessels within said containment enclosure was spilled, for example under accidental conditions, it could safely be received by said sub-critical spaces, even taking into account the sloping effect with the worst sloping plutonium-containing powders, i.e. with a sloping angle of up to 30°.

The present invention concerns also a processing plant for mixed uranium oxide, carbide and/or nitride, civilian or military origin plutonium oxide, carbide and/or nitride, and possibly other actinides such as americium, neptunium, or curium. This plant comprises a set of said vessels according to the invention installed in a set of said enclosures according to the invention so as to prevent the criticality risks.

The present invention concerns also a process for preparing nuclear fuel using a mixture of uranium oxide, carbide or nitride and civilian or military origin plutonium, in the form of, respectively, plutonium oxide, carbide or nitride, as well as possibly other actinides such as americium, neptunium, and/or curium.

To prevent the criticality risk, said mixture has a plutonium concentration not higher than a maximum guaranteed plutonium concentration, and an isotopic composition within a predetermined envelope. Throughout the whole process, substantially all of this mixture and any material resulting from it are contained within a set of vessels dimensioned so as to be sub-critical even if completely filled with said plutonium-containing mixture at said maximum guaranteed plutonium concentration, with any isotopic composition within said predetermined isotopic envelope, for any density up to a maximum guaranteed process density and under the most negative neutron reflection and moderation conditions.

By using such a safe configuration for all vessels containing the plutonium throughout the whole process, it is possible to ensure that criticality be prevented even against human error, such as, for example, double batching or blending error without resorting to complex and inherently fragile verification and control systems.

Advantageously, said process further comprises a comminuting step, so as to obtain a particularly intimate mixture and prevent hot spots in the nuclear fuel.

Advantageously, said process further comprises at least one additional mixing step, wherein, said mixture is mixed with additional uranium oxide, carbide or nitride. Since all subsequent steps are also performed using vessels dimensioned so as to be sub-critical even with the maximum guaranteed plutonium content of the mixture, criticality in the subsequent steps is avoided even if the at least one additional mixing step is mistakenly jumped over.

Advantageously, said nuclear fuel is pelletized, and the resulting nuclear fuel pellets are preferably sintered afterwards.

Advantageously, said process utilizes possibly neutron-moderating process additives.

Advantageously, said mixture is obtained by a dry process, comprising the following steps:
  verifying the predetermined mass and isotopic composition of the plutonium contained, in the form of plutonium oxide, carbide or nitride, in a set of containers;
  introducing, into a containment enclosure, said enclosure being, for example, in the form of a glove box or a hot cell, a batch of containers selected from among said set of containers so as to contain, at most, only enough plutonium for a single sub-critical batch of mixture;
  verifying that said batch of containers contains, at most, only enough plutonium for said single batch of mixture, preferably by mechanically verifying their predetermined mass;
  opening said batch of containers, after their leak-tight connection to an emptying vessel connected in a leak-tight manner to a mixing vessel also located in said containment enclosure;
  introducing in said mixing vessel, at most, only enough plutonium for a single batch of mixture and uranium, in the form of uranium oxide, carbide or nitride, to be mixed therewith;
  performing, in the mixing vessel, a continuous and rough homogenization of the mixture by mechanical means;
  verifying the plutonium content of the batch of mixture at an output, by at least mechanically verifying the total mass of the mixture and measuring its neutron emission.

Said constitution process has the advantage of ensuring that the plutonium content of the mixture is maintained within a certain range below the maximum guaranteed plutonium content. This in turn contributes to prevent the criticality risks downstream, with the help of vessels according to the invention.

The prevention of the criticality risk in a processing plant can therefore comprise:
  the division of the plant in various premises regrouping, within a separate premise and separately from the storage vessels, the process vessels presenting the same criticality risk, in function of the supply of neutron-moderating material they require in normal or accidental situations;

the identification and guarantee of ranges for the plutonium content, the plutonium isotopic composition and the density of plutonium-containing material, and the prevention of criticality in all process and storage vessels for these ranges;

the prevention of criticality in all situations, such as the normal, the nearly normal, the incidental, and the accidental, by permanent and easily guaranteed geometric dispositions.

The present invention also aims to retain the most effective fire prevention/extinguishing means, without having to compromise the prevention of the criticality risk. For example, it may allow to use water as extinguishing means every time that a proven fire risk exists, such as when the fire triangle of combustible materials, combustive and initiators is fulfilled, and water constitutes the most indicated extinguishing fluid.

DETAILED DESCRIPTION OF THE INVENTION

Details concerning a particular embodiment of the invention are described hereafter with reference to the following drawings in an illustrative and non-limitative manner.

In a nuclear fuel production plant and process with materials containing plutonium in the form of plutonium oxide, carbide and/or nitride, it is possible to establish a maximum guaranteed plutonium content and density, and an isotopic plutonium composition envelop, for the plutonium-containing materials throughout the production process, based on the plutonium content, density and isotopic composition of the feed materials. By designing all the various vessels and devices used for containing and processing the plutonium-containing materials so that they remain sub-critical even with said maximum guaranteed plutonium content and density and isotopic composition envelop, it is possible to prevent the criticality risk even when, due to human error or the failure of control systems, the normal plutonium content and/or density are exceeded in a given process step. This may happen, for instance, if the plutonium oxide is not duly diluted, or, in a nuclear fuel production process with double mixing, such as MIMAS, if the primary is mistaken with the secondary mixture.

Using specific sub-critical geometries, it is possible to ensure this criticality prevention even for the most negative filling, reflection and moderation conditions, in normal, close to normal, and/or incidental situations.

As close to normal or incidental situations, are understood all anomalies and failures that can result from one or several hardware or software failures of an automatic control, such as a calculator, sequential automatic control, automatic dosing control, or sensor, or from a faulty administrative operation, such as an erroneous material acquisition, consignment, command input, data reporting or input.

These geometries are also safe for an accidental supply of neutron-moderating material caused, for example, by the bursting of water or oil ducts, fire extinguishing with water sprinklers, etc.

The various embodiments of the invention include a full family of geometrically safe vessels for plutonium-containing material, as well as a containment enclosure, such as, for example, a glovebox, a hot cell, with a geometrically safe bottom catcher for safely collecting a spillage of plutonium-containing material resulting, for example, from an accidental loss of integrity of these vessels.

For the preparation of plutonium-containing powders and/or granulates annular or slab geometry devices are chosen whose dimensions are verified as sub-critical, with the safety and uncertainty coefficients imposed by the relevant authorities, for a partial or total filling of the available volume, for a reflection by a layer of water at the limits and for all moderation conditions by water and/or other possibly present moderation materials in the ring or the slab. With this approach it is no longer necessary to prevent against double or multiple batching of the plutonium-containing material and/or of the moderating additives.

Figure 1:
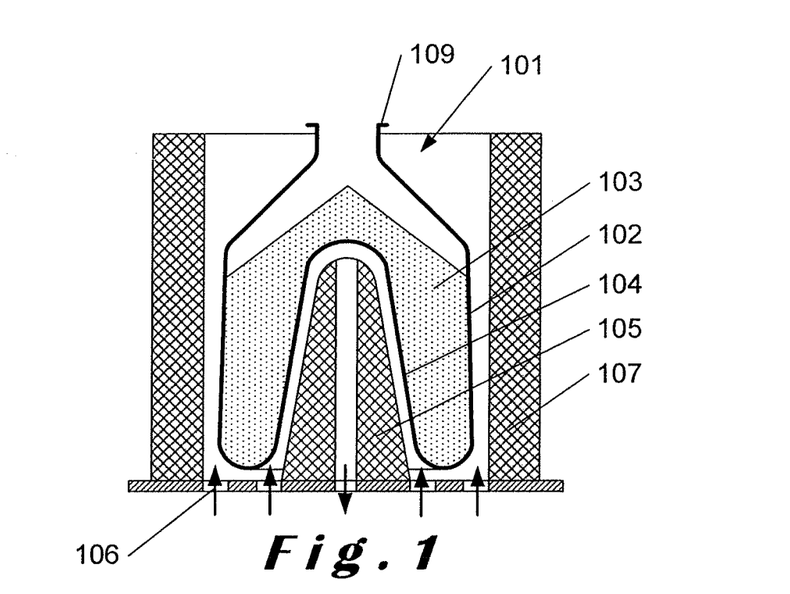
FIG. 1 represents a sectional view of an annular transfer vessel, in the form of a jar, according to an embodiment of the invention.
Figure 9:
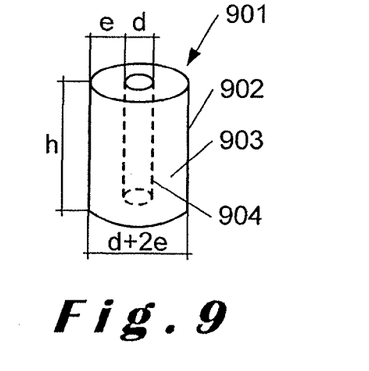
FIGS. 9 and 10 are schematic perspective views of the volumes of vessels according to two different embodiments of the invention.

FIG. 1 shows a transfer and/or mixing vessel, in the form of a jar 101 with an annular geometry. This jar 101 comprises a volume 103 of 20 to 50 liters, with a height h between 30 and 60 cm, and demarcated by two substantially concentric and substantially cylindrical walls 102,104 separated by a distance e between 8 and 15 cm. The interior wall 104 demarcates a core with a diameter d between 10 and 30 cm. This interior wall 104, although substantially cylindrical, may present a slight conicity of up to 15° to ease the extraction of powdered material from the jar 101. The core may comprise a neutron absorber 105. The jar 101 has a single opening 109 for introducing and/or extracting plutonium-containing material into the volume 103. This volume 103 is also schematically illustrated in FIG. 9. The jar 101 may also be provided with radiation shielding 107, in order to protect those surrounding the jar 101, and with cooling 106, to prevent an excessive rise in temperature of additives present in the powder contained in the jar 101.

This jar 101 may be held in a vertical or tilted position, or it may be tiltable around a horizontal axis.

Figure 2:
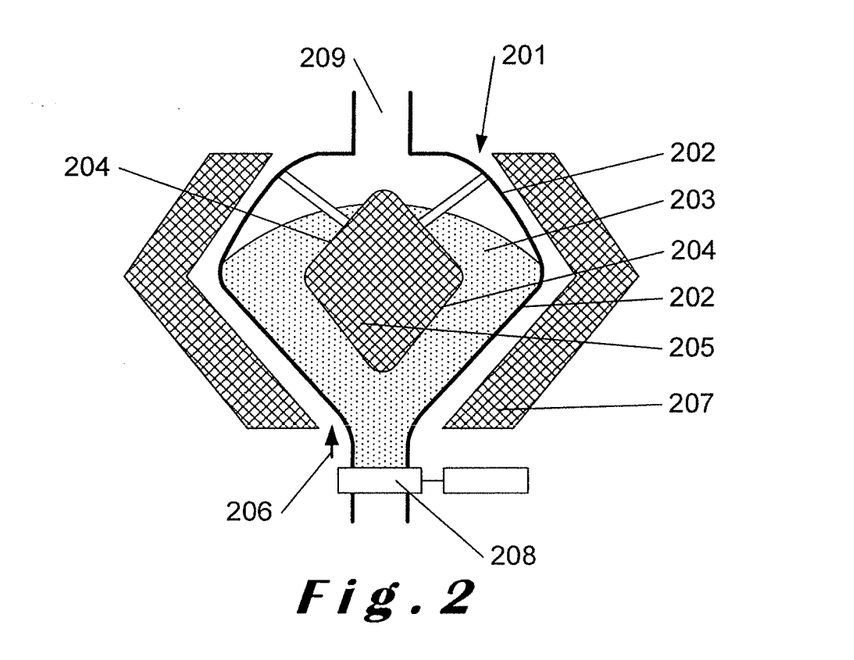
FIG. 2 represents a sectional view of an annular accumulation vessel, in the form of a hopper, according to another embodiment of the invention.

FIG. 2 shows an accumulation and/or transfer vessel, in the form of a hopper 201. This hopper 201 also has an annular geometry. However, the volume 203 of the hopper 201 is demarcated by substantially conical walls 203,204. In particular, both the exterior walls 203 and the interior walls 204 are substantially shaped as double cones around a single vertical axis of revolution, so as to facilitate flow of plutonium-containing material between an upper opening 209 and a lower opening 208 with seal, while maintaining both height and maximum diameter of the hopper 201 within limits. As in the jar 101, the volume 203 in the hopper 203 is between 20 and 50 liters with a height h between 30 and 60 cm, and a distance e between the exterior and interior walls 203,204 between 8 and 15 cm. The interior wall 204 also demarcates a core with a diameter d between 10 and 30 cm, possibly containing a neutron absorber 205.

Figure 3:
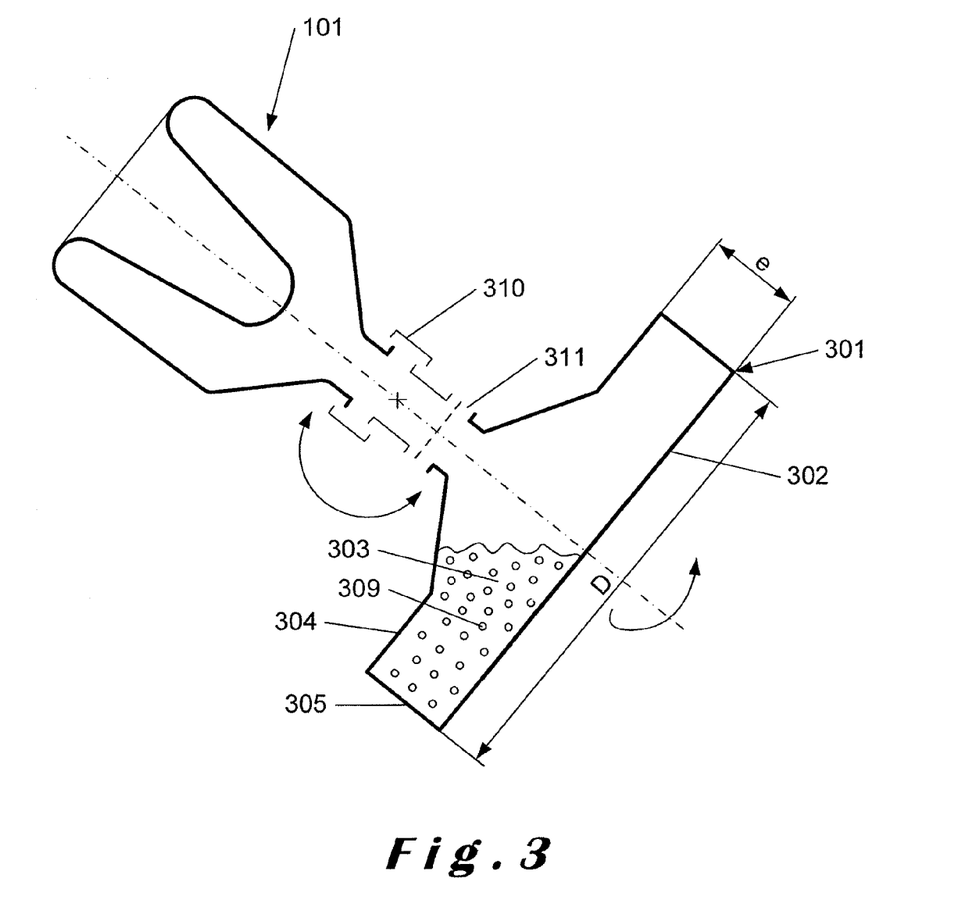
FIG. 3 represents a sectional view of a ball mill according to another embodiment of the invention.
Figure 10:
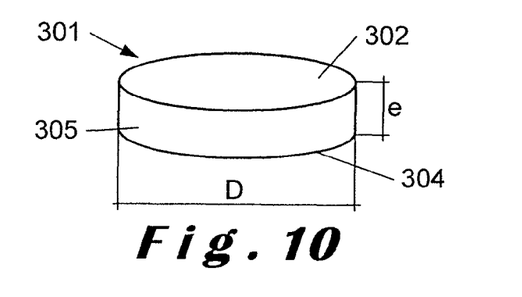

For crushing plutonium-containing material, one possibility is an <<airjet>>-type crusher with a safe geometry. Another possibility is a ball mill 301 with a flat cylindrical geometry, as shown in FIG. 3. In this ball mill 301, a volume 303 for receiving plutonium-containing material and a plurality of crushing mill balls 309 is demarcated by two substantially flat, substantially parallel walls 302, 304, separated by a distance e between 8 and 15 cm, and a cylindrical wall 305 with a diameter D between 70 and 90 cm. This geometry is also schematically illustrated in FIG. 10. The volume 303 is between 40 and 70 liters.

The ball mill 301 is mounted rotatable around a non-vertical axis, so that the mill balls 309 crush the plutonium-containing material within the volume 303 during rotation. Said plutonium-containing material can be introduced in the volume 303 and/or extracted from it through an opening, preferably centrally located, of said ball mill 301. Said opening preferably comprises a ball retention grid 311, as shown in FIG. 3. Also, said opening may be couplable with the opening 109 of a jar 101 using a holder/coupling 310. As also shown in FIG. 3, the plutonium-containing material may be transferred between jar 101 and ball mill 301 by tilting the coupled jar 101 and ball mill 301 around a substantially horizontal axis.

Figure 4:
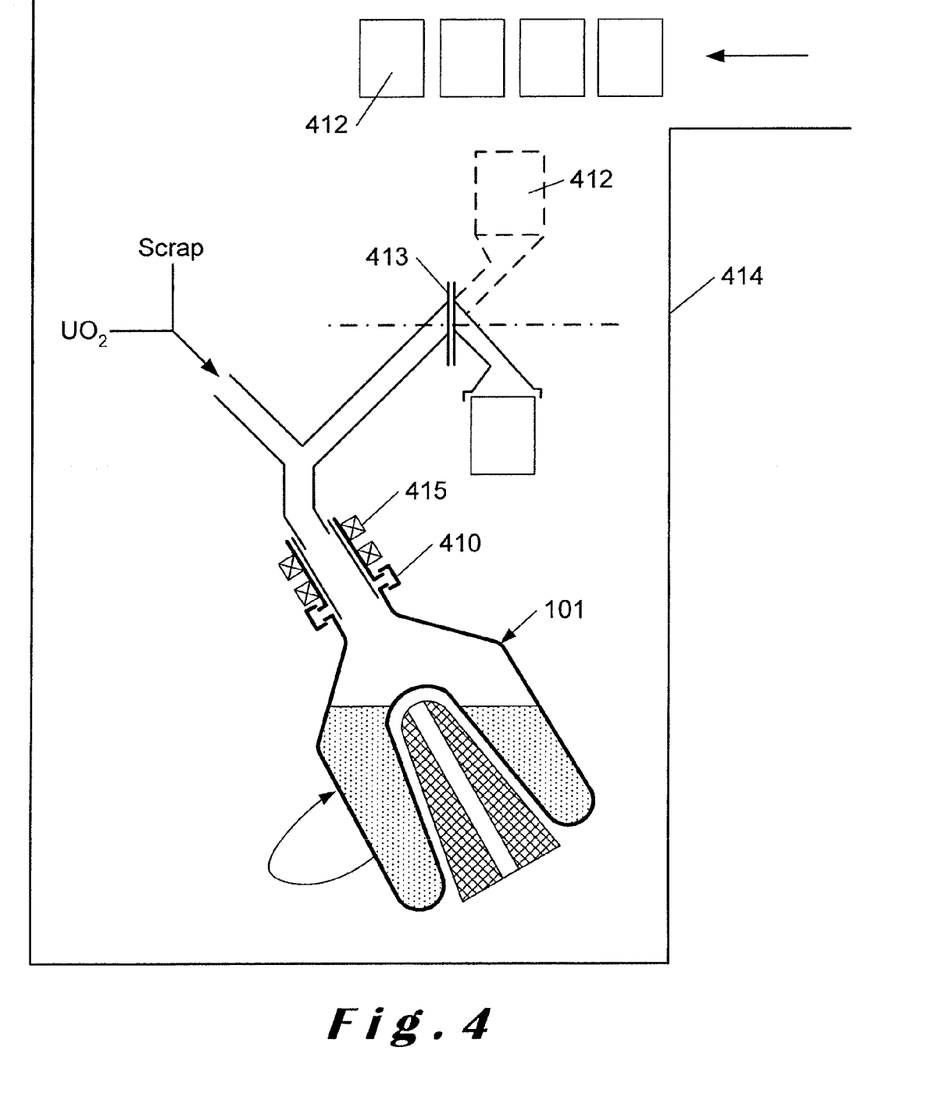
FIG. 4 represents a schematic view of a containment enclosure containing a mixing vessel according to another embodiment of the invention.

A jar 101, mounted rotatable around a non-vertical axis on at least one bearing 415, as illustrated in FIG. 4, may instead be used as a mixing vessel for preliminary homogeneization, instead of industrial screw mixers.

Figure 5:
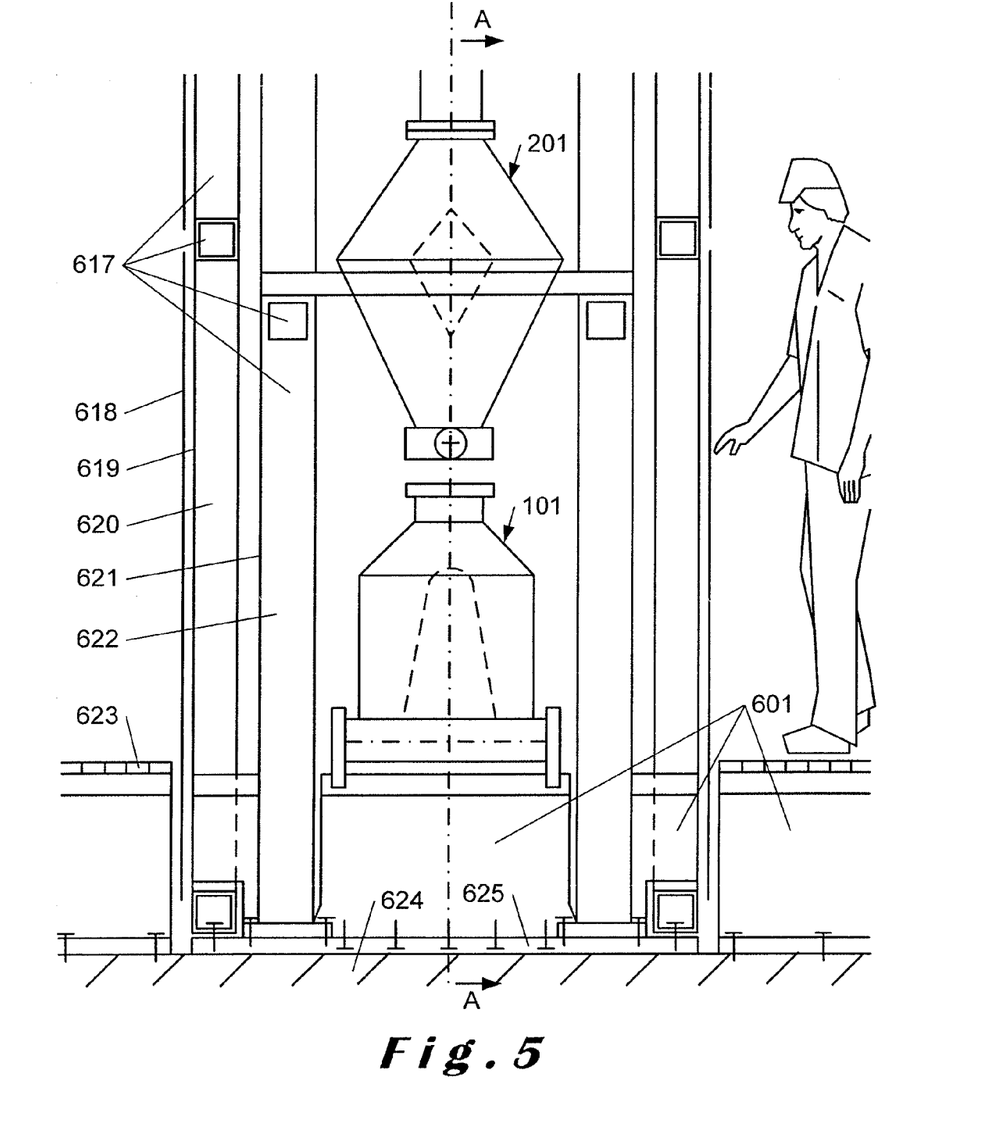
FIG. 5 represents a containment enclosure according to another embodiment of the invention.
Figure 6:
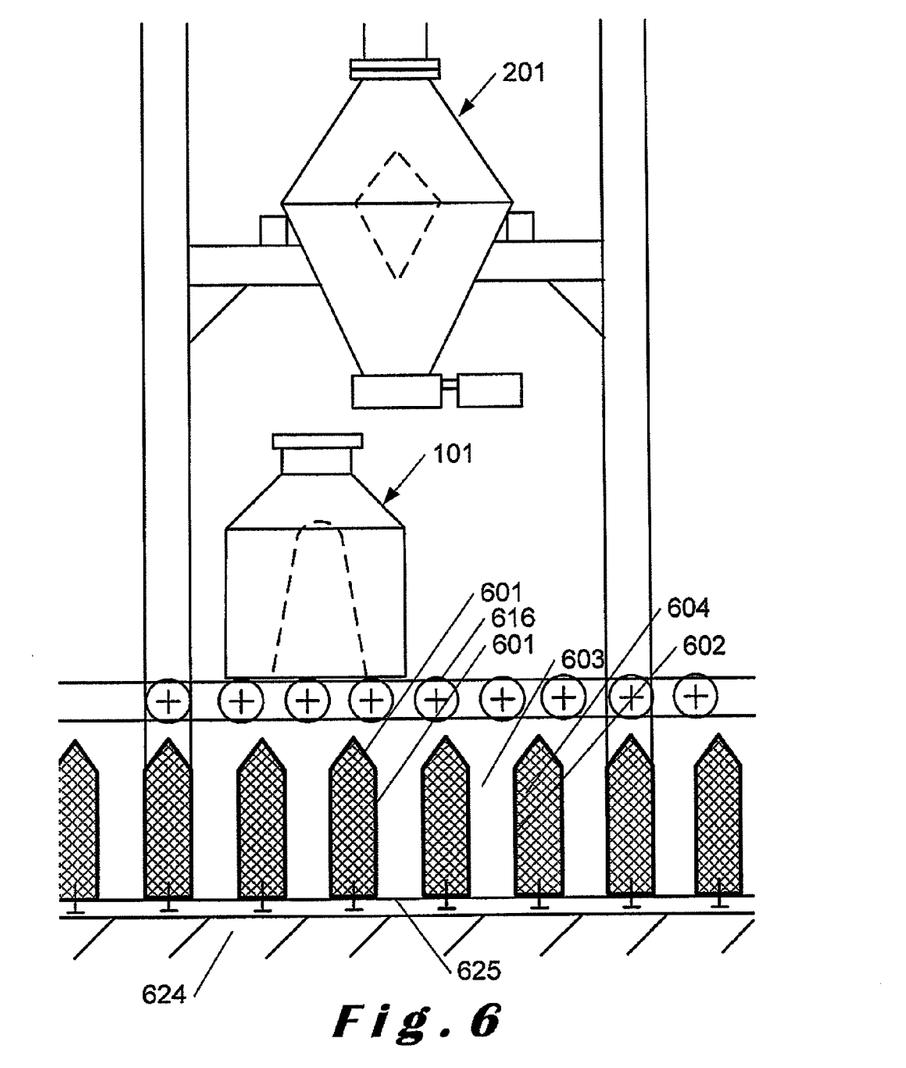
FIG. 6 represents another view of the same containment enclosure along line A-A of FIG. 5.

Criticality prevention in accidental situations, for said given ranges of isotopic plutonium composition, plutonium content and density and even for the most negative conditions of reflection and moderation, can also be ensured using bottom catcher devices with singular geometries, as shown in FIGS. 5 and 6.

Accidental situations may be, for instance, seismic situations, fire situations and accidental moving load drops. Such seismic situations may be of natural and/or artificial origin. An artificial seismic situation may originate, for example, from a civilian or military airplane crash. Accidental fire situations may be also aggravated by the use of water sprinklers for extinction purposes. Accidental falls are also a possible risk, since, for instance, in powder gravity transfer plants, vessels containing plutonium-containing material are often raised above processing devices to load them with said plutonium-containing material.

For protection against these situations in a nuclear fuel processing plant, attention will be given to dimensioning to fulfill general stability criteria with possible partial plastic deformation and to ensure the stability of the process equipment and containment enclosure structures during a standard fire, for example, by coating with a fire-resistant paint 619, as illustrated in FIGS. 5 and 6, at least some of the metallic structures 617 in the processing plant.

Nevertheless, to respond to eventual spillages of plutonium-containing material in and/or around a containment enclosure, a sub-critical bottom catcher 500 may be provided in and/or around the containment enclosure. FIGS. 5 and 6 illustrate such a bottom catcher 500 at the bottom of a glove-box-type containment enclosure formed by a structure 620 with transparent panels. In the illustrated embodiment the containment enclosure is provided to enclose a jar 101 transported over rolls 616, so that it can be filled with plutonium-containing material from a hopper 201. To catch any spillage from the jar 101, hopper 201 or other process vessels, the bottom catcher 500 comprises a plurality of sub-critical spaces 603 separated by passive parts 601. These passive parts 601, also known as separators, are at least partially metallic and filled preferably with a solid, mineral and neutron-absorbing material 605. Each one of said sub-critical spaces 603 is demarcated by at least two substantially parallel and vertical walls 602, 604 having a height h between 30 and 50 cm, and separated by a distance e between 8 and 12 cm. The parts 601 have a thickness p between 10 and 15 cm. The bottom catcher 500 of the illustrated embodiment is dimensioned and/or qualified to ensure its geometry in situations of fire, earthquake and fall of loads. The catcher is dimensioned so as to ensure the retention of the totality of the plutonium-containing material that can be simultaneously present in the containment enclosure at any given moment and to be sub-critical in all conditions of neutron moderation, even when taking into account the effective retention volume limited by the sloping effect of powders with poor flowability, which may presenting a sloping angle of up to 30° with respect to the vertical. The volume of the heap of plutonium-contained material that may accumulate with that sloping angle above the upper level of these separators should form a negligible fraction of the total. It would comprise, for instance, a mass smaller than 10% of the total mass of spilled plutonium-containing material, or a conic pyramid the diameter of which circular base is less than one pitch, that is, the sum of the thickness p and the distance e.

All the above-mentioned principles for preventing criticality can be integrated in a single plant for processing mixed oxides of plutonium and uranium.

In such a plant, the devices that present particular risks from the criticality point of view are preferably installed in special premises. One such special premise is illustrated in FIG. 4. This special premise contains a mixing jar 101 for mixing uranium oxide, scrap and plutonium oxide introduced into the premise in plutonium containers 412, so as to realize a mixture of with a guaranteed maximum content of plutonium. This may be required in plants receiving pure plutonium so as to dilute it before further processing.

Criticality is prevented and the plutonium content of the mixture guaranteed by a combination of the following arrangements:

the use of mechanically fool-proofed containers 412;

the sequential introduction of the constitutive elements of the mixture in a mixing jar 101; and the continuous and rough homogenization of the mixture by mechanical means, such as, in the illustrated embodiment, by rotating the jar during the constitution of the mixture.

Various high-reliability mechanical control devices are preferably used for certain controls. For example, the containers 412 and/or the mixing jar 101 may be mechanically fool-proofed by their shape and dimensions, the mass of plutonium-containing material may be verified using an articulated rail segment and/or a pre-stressed spring system, the number of jars 101 in a device or on a maintenance rail may be checked using a mechanical memory, etc.

Such reliable mechanical control devices avoid instrumented or digital devices that are less reliable and more expensive, and furthermore need special precautions for calibration, zeroing and/or uninterrupted electrical supply.

Storage facilities, which present different risks, have a reduced fire risk and guaranteed extinction, and are thus bound to require different solutions than the process facilities, may be installed in special fire-compartmentalized premises reserved for this only purpose.

Figure 8:
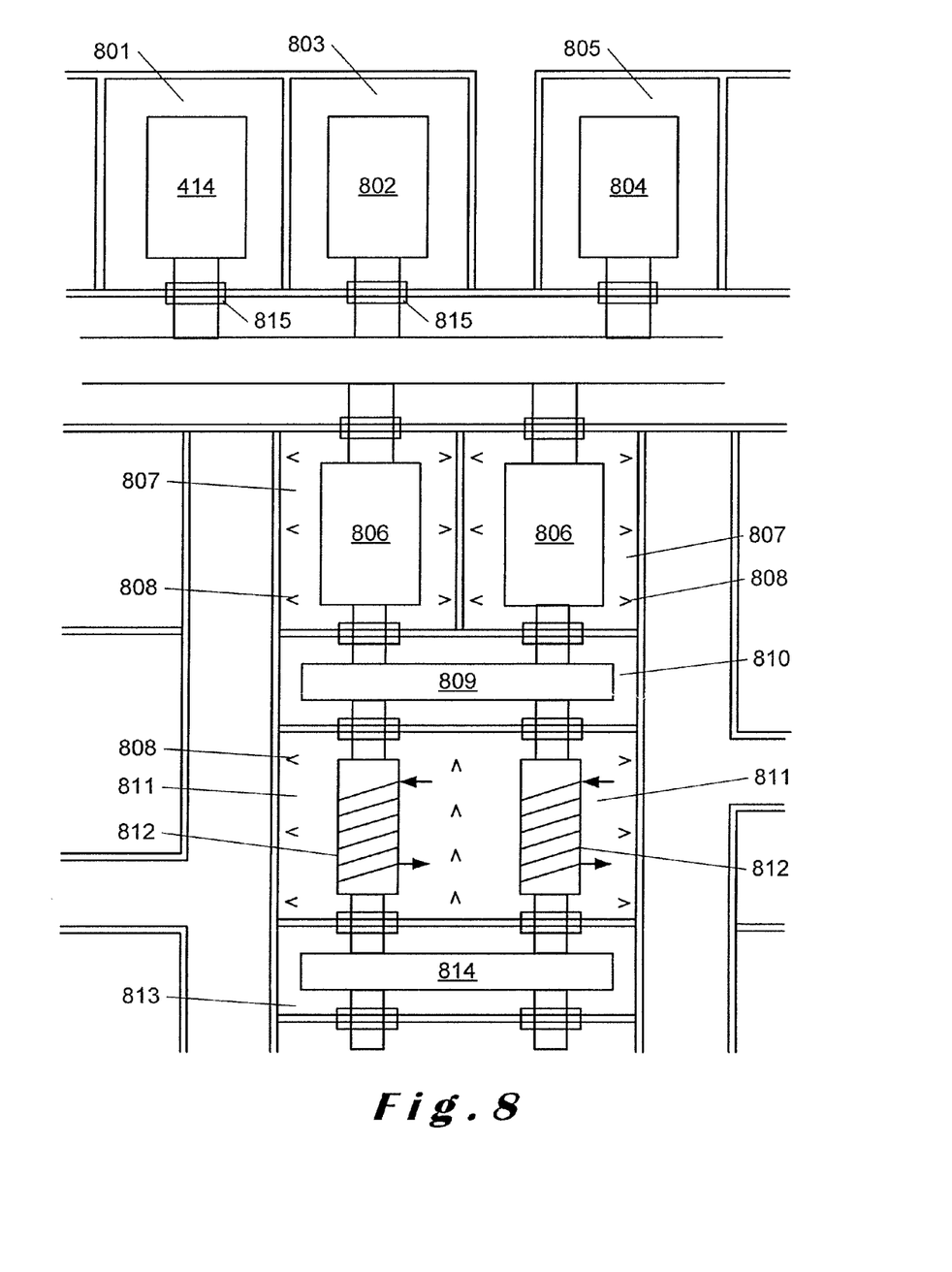
FIG. 8 is a schematic representation of a nuclear fuel processing plant according to the invention.

As shown in FIG. 8, it will be preferable, even if not necessary, to regroup the sintering ovens and the equipments for pelletizing by hydraulic pressing in dedicated, fire-compartmentalized premises, since they present increased fire hazards and comprise important sources of neutron-moderating materials, such as the oven cooling water, and the oil from the hydraulic presses for pelletizing. Ideally, although difficult to achieve in accidental conditions, fire extinguishing sprinklers might be applied in line with rules well-known by the skilled person.

Figure 7:
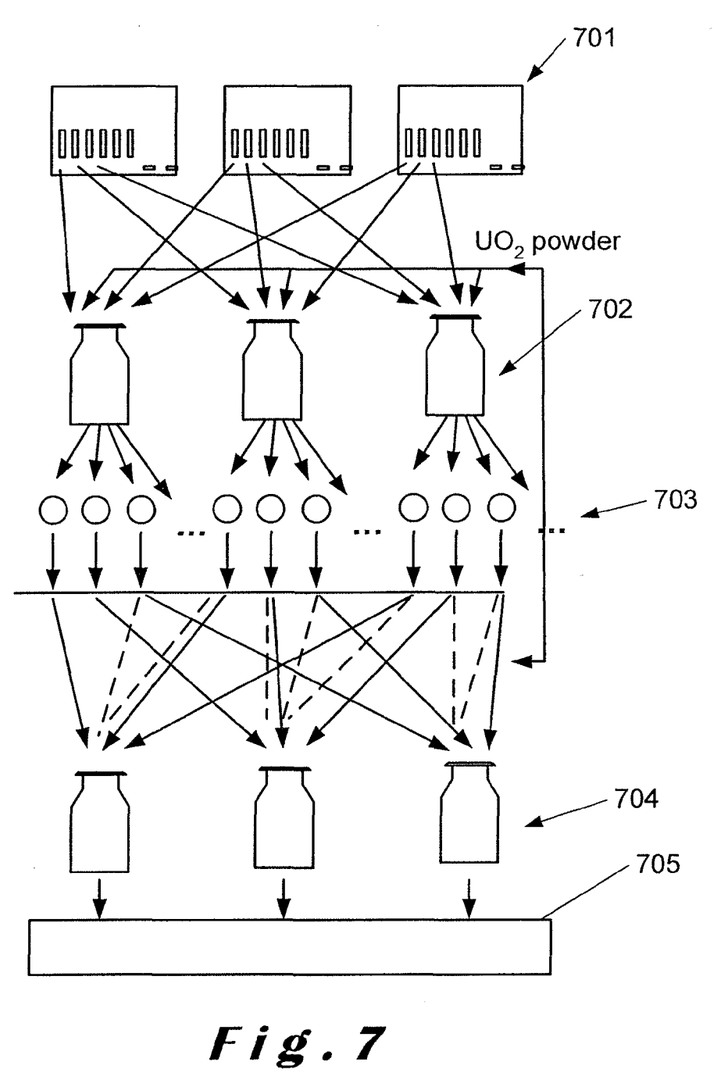
FIG. 7 is a schematic representation of the preparation process of the invention to achieve simple or double isotopic homogeneization.

Illustratively, a process for preparing MOX fuel from civilian and military plutonium in the form of plutonium oxide will now be briefly described with reference to FIGS. 7 and 8. Usually a maximum plutonium content of 25% in the plutonium-containing feed material will be encountered in a MOX fuel plant using plutonium of military origin and a maximum plutonium content of 50% in a MOX fuel plant using plutonium resulting from the reprocessing of spent $UO_2$ fuels from commercial light water reactors, whether these plants are intended to produce fuel intended for light water reactors or for rapid neutron reactors.

In a plant where the plutonium oxide is diluted in an upstream commercial reprocessing or conversion plant, it will be possible to ensure the prevention of criticality for a plutonium content of 50% wt. (for example, in the JMOX receiving MH-MOX from the JNFL reprocessing plant in Rokkasho-mura—Japan) during the whole MOX preparation process by means of controls at the output of this plant and/or controls at the input of the plant performing this MOX fuel preparation process guaranteeing the plutonium content.

The skilled person is generally aware of an isotopic composition of approximately 70/18/10/2 respectively for the isotopes $Pu_{239}$, $Pu_{240}$, $Pu_{241}$, $Pu_{242}$ of plutonium resulting from reprocessing commercial $UO_2$ spent fuel with a burnup up to 50 GWd/t. On the other hand a military plutonium or that resulting from reprocessing used fuels from graphite/gas reactors, such as, for example, Magnox, usually has an isotopic composition of 95/4/1/—used for criticality safety neutronic calculations.

The maximum density of a crushed-micronized MOX mixture or of loose sintered MOX tablets is estimated at 5-5.5 g/cm$^3$.

With these parameters, the following embodiment of a nuclear fuel preparation process according to the invention may be performed in a medium-capacity (80 tHM MOX/year) plant for LWR MIMAS MOX fuel production as illustrated in FIG. 8:

The feed materials are received into the plant in the form of sealed containers, such as cans, of 3 kg of pure plutonium oxide originating from a batch of 100 kg and bulk fresh uranium originating from a batch of 3000 kg. The plutonium oxide 701 is introduced into the plant in a set of sealed containers 412. The mass and isotopic composition of each container 412 of this set is verified as it is introduced in the plant, so as to conform to a guaranteed envelope.

Within the plant, a containment enclosure 414, such as a glove box or a hot cell, in a fire compartment 801, contains an annular mixing jar 101, as described above and shown in FIGS. 1 and 4. In a first step 701, a primary mixture of uranium oxide and plutonium oxide is constituted in said containment enclosure 414.

From the set of containers 412, a batch of containers 412, containing, in total, no more than 20 kg of plutonium oxide, is then introduced into the containment enclosure 414. The mass of the batch of containers 412 introduced in the containment enclosure 414 is verified at its entrance or exit using an articulated rail segment and/or a pre-stressed spring system, possibly with a mechanical memory.

Within this containment enclosure 414, each container 412 is in turn connected in a leak-tight manner to an emptying device 413, connected itself in a leak-tight manner to the annular mixing jar 101. Only then is the container 412 opened, so as to empty the plutonium oxide into the annular mixing jar 101. To make a primary mixture of 60 kg with a concentration of 30% in $PuO_2$, 5 containers 412 of 3 kg will be opened and emptied, while 45 kg of nuclear fuel production scraps and/or uranium oxide are also introduced in the same annular mixing jar 101. The abovementioned scrap consists in material not usable in the final product. It originates from the different steps of fuel production, such as samples, rejected pellets, material resulting from pellet grinding to diameter and material produced in excess. The production scrap is available in different forms (sintered/not sintered, powder or pelletized) and quantities. To be recycled in the fuel as a third feed product with constant and characterized characteristics, the scraps are currently undergoing different dry batch processes such as pelletizing, sintering, crushing, comminuting and blending. The plutonium oxide, scraps and uranium oxide are then roughly mixed by rotating the annular mixing jar 101 to produce 60 kg of a primary mixture. The primary mixture is transferred to another containment enclosure containing a mill such as the previously described ball mill 301, also illustrated in FIG. 3, wherein this primary mixture is comminuted with crushing balls. A mill of a different type, such as an airjet mill, could however be used instead.

In the next stage 703, the 60 kg of comminuted primary mixture are then conditioned in intermediate 5 kg cans and eventually brought to a buffer storage containment enclosure 802 in a separate fire compartment 803.

When needed, for example to prepare a secondary blend of with a concentration of 6% $PuO_2$, 4 5 kg cans of comminuted primary mixture are transferred for the constitution 704 of a secondary mixture to a second mixing jar 101, installed in yet another containment enclosure 804 in a separate fire compartment 805. In this second mixing jar 101, an additional 60 kg of fresh uranium oxide from the batch of 3000 kg is also introduced, to be mixed with the comminuted primary mixture. The resulting 80 kg of nuclear material are then mixed within said containment enclosure 804, in another mixer (not represented), to form a secondary mixture, and introduced in a hopper 201, such as has been previously described and shown in FIG. 2, for its pelletizing 705 in hydraulic pelletizing presses located in pelletizing containment enclosures 806 in separate fire compartments 807. Due to the increased fire risk, but reduced criticality risk in these fire compartments 807, they can be equipped with sprinkler systems 808 for fire prevention.

Additives may also be added to the primary or secondary mixtures. Some additives, such as, for example, organometallic poreformers may be added to control the density of the mixture. Lubricating additives, such as zinc stearate, may also be added, so as to facilitate pelletizing. These additives present neutron moderating properties due to their content in hydrogen and/or carbon.

The pelletizing presses are then loaded with the secondary mixture from the hopper 201. This secondary mixture is then compressed, so as to produce MOX fuel pellets, which, after eventual intermediate storage in another containment enclosure 809 in a separate fire compartment 810, are then introduced for sintering in a sintering fire compartment 811, also equipped with sprinklers 808, wherein they are sintered in sealed sintering ovens 812, which also form containment enclosures, so as to consolidate them. The sintered pellets can then be transferred to another fire compartment 813 for storage in another containment enclosure 814, from which they may be taken for further processing, such as diameter grinding and stacking for final integration in fuel rods and assemblies, or shipping.

For enhanced safety, quality and efficiency, all this process may be managed according to "kanban" rules up to at least the pelletizing.

In and/or around each one of the containment enclosures 414, 804, 806, and/or 812, bottom catchers, such as the bottom catcher 500 described above and shown in FIGS. 5 and 6, may be installed to prevent the criticality risk even in cases of spillage of plutonium-containing material.

Each individual fire compartment is accessible only through one or several fire locks 815.

Figure 11:
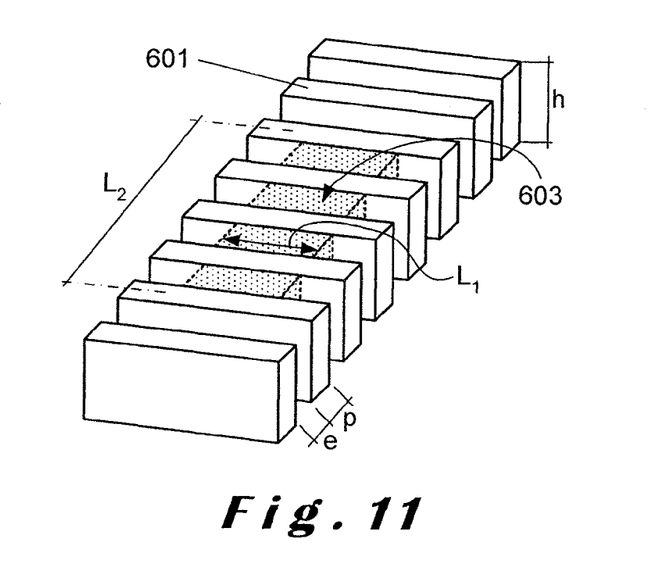
FIG. 11 is a schematic perspective view of sub-critical spaces of a containment enclosure such as that represented in FIGS. 5 and 6.

Tables 1 to 3 present an illustrative selection of sub-critical geometries, i.e. geometries presenting an effective neutron multiplication coefficient $k_{eff} < 0.95$ for all filling and moderation conditions and for a reflection with $H_2O$:

An annular geometry, as in FIGS. 1, 2 and 8 and table 1, for the transfer and accumulation vessels, such as the jars 101 and the hoppers 201;

a flat cylindrical geometry (FIGS. 3 and 10 and table 2) for the ball mills 301; and a parallel slab geometry (FIGS. 5, 6 and 11 and table 3) for catcher devices in containment enclosures.

Even if this description has been oriented towards the domain of the production of mixed oxides, carbides and/or nitrides of uranium and of plutonium, possibly associated with other transuranic actinides, such as americium, neptunium, and/or curium for augmenting the resistance to proliferation, the processes and devices of the invention can also be extended to the following fuel families:

Dispersions of a non-metallic compound of plutonium, such as plutonium oxide, carbide and/or nitride, in an inert matrix; or fuels implementing the thorium and uranium cycle.

Although the present invention has been described with reference to specific exemplary embodiments, it will be evident that various modifications and changes may be made to these embodiments without departing from the broader scope of the invention as set forth in the claims. Accordingly, the description and drawings are to be regarded in an illustrative sense rather than a restrictive sense.

| DRAWING ANNOTATION | | |
|---|---|---|
| 101 | Jar | |
| 102 | Outer wall | |
| 103 | Volume | |
| 104 | Inner wall | |
| 105 | Neutron absorber | |
| 106 | Cooling | |
| 107 | Radiation shielding | |
| 109 | Opening | |
| 201 | Hopper | |
| 202 | Outer wall | |
| 203 | Volume | |
| 204 | Inner wall | |
| 205 | Neutron absorber | |
| 206 | Cooling | |
| 207 | Radiation shielding | |
| 208 | Lower opening with seal | |
| 209 | Upper opening | |
| 301 | Ball mill | |
| 302 | Flat wall | |
| 303 | Space | |
| 304 | Flat wall | |
| 305 | Cylindrical wall | |
| 309 | Mill balls | |
| 310 | Holder/Coupling | |
| 311 | Ball retention grid | |
| 410 | Holder/Coupling | |
| 412 | Impervious plutonium containers | |
| 413 | Emptying device | |
| 414 | Premise | |
| 415 | Rotation bearing | |
| 601 | Flat passive parts | |
| 602 | Wall | |
| 603 | Volume | |
| 604 | Wall | |
| 605 | Solid and mineral neutron absorber | |
| 616 | Roll conveyors | |
| 617 | Solid and mineral neutron absorber | |
| 618 | Transparent panels | |
| 619 | Fire-resistant paint | |
| 620 | Containment enclosure structure | |
| 621 | Fire-resistant paint | |
| 622 | Process equipment structure | |
| 623 | Grating | |
| 624 | Concrete floor | |
| 625 | Metallic bottom | |
| 701 | $PuO_2$ powder batches | |
| 702 | Constitution of primary mixtures in jars | |
| 703 | Conditioning of the primary mixtures in intermediate cans and possible storage | |
| 704 | Constitution of secondary mixtures in jars | |
| 705 | Pelletizing | |
| 801 | Fire compartment | |
| 802 | Containment enclosure | |
| 803 | Fire compartment | |
| 804 | Containment enclosure | |
| 805 | Fire compartment | |
| 806 | Containment enclosure | |
| 807 | Fire compartment | |
| 808 | Sprinkler system | |
| 809 | Containment enclosure | |
| 810 | Fire compartment | |
| 811 | Fire compartment | |
| 812 | Sintering oven | |
| 813 | Fire compartment | |
| 814 | Containment enclosure | |
| 815 | Fire lock | |
| 901 | Vessel | |
| 902 | Outer wall | |
| 903 | Volume | |
| 904 | Inner wall | |

TABLE 1

Neutron multiplication coefficients ($k_{eff}$)
for an annular vessel (jar, hopper, mixer, etc)

| | | | | | | | Reflection | | | | | |
| | | | | | | | $H_2O$-filled core | | | | | |
| | | | | | | | ring surrounded by 20 cm $H_2O$ | | | | | |
| | Isotopic composition (%) | | | | $PuO_2$ content | Density δ | $k_{eff}$ Moderation by $H_2O$ (g/cc) | | | | | |
| Geometry | $Pu_{239}$ | $Pu_{240}$ | $Pu_{0241}$ | $Pu_{242}$ | (%) | (g/cc) | 0 | 0.2 | 0.4 | 0.6 | 0.8 | 1 |
| d = 15 cm | 95 | 4 | 1 | — | 30 | 5 | 0.57 | 0.65 | 0.64 | 0.82 | 0.88 | 0.96 |
| d + 2e = 35 cm V = 23.5 l H = 30 cm | 70 | 18 | 10 | 2 | 50 | 5 | 0.64 | 0.72 | 0.79 | (*) 0.85 | 0.91 | 0.94 |

WIMS code calculation
(*) 0.92 for d = 20 cm, d + 2e = 40 cm, h = 40 cm

TABLE 2

Neutron multiplication coefficients ($k_{eff}$)
for slab geometry process devices

| Geometry | Source |
|---|---|
| D = 80 cm | content: 50% |
| E = 12 cm | density: 5 g/cc |
| V = 60 l | isotopy: 70/18/10/2% |
| | Reflection: 2.5 cm $H_2O$ |
| | Moderation: 0.55 g/cc $H_2O$ |
| WIMS code calculation | $k_{eff}$ = 0.92 |

TABLE 3

Neutron multiplication coefficients ($k_{eff}$) for a N slab geometry

| Geometry |
|---|
| N = 4 |
| P = 15 cm |
| e = 10 cm |
| h = 35 cm |
| $L_1 = L_2$ = 100 cm |
| V = 140 l |
| Source |
| content: $\frac{PuO_2}{UO_2 + PuO_2}$ = 50% |
| density δ (see below) |
| isotopic composition: |
| $Pu_{9,0,1,2}$ = 70/18/10/2% |
| Reflection - Moderation |
| reflection in bottom part by 30 cm concrete and in top part by 2.5 cm $H_2O$ moderation by 0.8 g/cc $H_2O$ |

| δ | $k_{eff}$ |
|---|---|
| 1 | 0.82 |
| 5 | 0.95 |

The invention claimed is:

1. A containment enclosure for processing or storing material containing civilian or military origin plutonium in the form of plutonium oxide, plutonium carbide or plutonium nitride, said containment enclosure comprises a perimeter and a bottom, said containment enclosure being dimensioned to enclose a vessel having a predetermined volume and provided for storing said material, said containment enclosure comprises at its bottom a bottom catcher comprising a plurality of sub-critical spaces which are separated by passive parts forming separators and provided for catching spilt plutonium-containing material, each one of said sub-critical spaces define a space and a volume and is demarcated by at least two substantially parallel and vertical walls having a height (h) between 30 and 50 cm, and separated by a distance e between 8 and 12 cm, said sub-critical spaces being provided to be filled with a solid, mineral and neutron-absorbing material, said bottom catcher being dimensioned to retain a further volume being at least equal to said predetermined volume.

2. The containment enclosure according to claim 1, wherein the further volume of said sub-critical spaces is higher than the predetermined volume of said vessel.

3. A containment enclosure, enclosing a vessel, said containment enclosure being provided for processing or storing material containing civilian or military origin plutonium in the form of plutonium oxide, plutonium carbide or plutonium nitride, said containment enclosure comprises a perimeter and a bottom, said vessel having a predetermined volume and provided for storing said material, said predetermined volume is comprised between 20 to 70 liters, demarcated at least by two substantially parallel walls for containing said material, these two walls being separated by a distance between 8 and 15 cm, said containment enclosure comprises at its bottom a bottom catcher comprising a plurality of sub-critical spaces which are separated by passive parts and provided for catching spilt plutonium-containing material each one of said sub-critical spaces define a space and a volume and being demarcated by at least two substantially parallel and vertical walls having a height (h) between 30 and 50 cm, and separated by a distance e between 8 and 12 cm, said sub-critical spaces being provided to be filled with a solid, mineral and neutron-absorbing material, said bottom catcher being dimensioned to retain a further volume being at least equal to said predetermined volume.

* * * * *